US012586942B2

(12) United States Patent
Lang et al.

(10) Patent No.: US 12,586,942 B2
(45) Date of Patent: Mar. 24, 2026

(54) CARD EDGE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Pengfei Lang, Mie (JP); Daisuke Saito, Mie (JP); Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 300 days.

(21) Appl. No.: 18/281,931

(22) PCT Filed: Feb. 24, 2022

(86) PCT No.: PCT/JP2022/007443

§ 371 (c)(1),
(2) Date: Sep. 13, 2023

(87) PCT Pub. No.: WO2022/196269

PCT Pub. Date: Sep. 22, 2022

(65) Prior Publication Data

US 2024/0313447 A1 Sep. 19, 2024

(30) Foreign Application Priority Data

Mar. 17, 2021 (JP) ................................ 2021-043092

(51) Int. Cl.
*H01R 12/91* (2011.01)
*H01R 12/72* (2011.01)

(52) U.S. Cl.
CPC .......... *H01R 12/91* (2013.01); *H01R 12/721* (2013.01)

(58) Field of Classification Search
CPC ..... H01R 12/716; H01R 12/721; H01R 12/91
See application file for complete search history.

(56) References Cited

U.S. PATENT DOCUMENTS 5,306,169 A * 4/1994 Fukushima .......... H01R 12/737 439/248
5,632,638 A * 5/1997 Matsushita .......... H01R 12/721 439/260

(Continued)

FOREIGN PATENT DOCUMENTS

JP 2002-025697 A 1/2002
JP 2003-297458 A 10/2003

(Continued)

OTHER PUBLICATIONS

International Search Report issued on May 10, 2022 for WO 2022/196269 A1 (6 pages).

*Primary Examiner* — Marcus E Harcum
(74) *Attorney, Agent, or Firm* — Venjuris, P.C.

(57) ABSTRACT

It is aimed to provide a card edge connector capable of improving electrical conduction between a terminal and a board. A card edge connector (1) is provided with a housing (12) and a terminal fitting (13) including a base portion (13A) to be fixed to the housing (12), a contact portion (13D) to be brought into electrical contact with a circuit board (62) assembled with the housing (12) and a spring portion (13C) provided between the base portion (13A) and the contact portion (13D) for displaceably supporting the contact portion (13D).

9 Claims, 8 Drawing Sheets

(56) References Cited

U.S. PATENT DOCUMENTS

| | | | | |
|---|---|---|---|---|
| 5,634,819 | A * | 6/1997 | Pan | H01R 12/721 439/947 |
| 6,126,496 | A * | 10/2000 | Shinozaki | H01R 13/7033 439/862 |
| 6,315,621 | B1 * | 11/2001 | Natori | H01R 13/2492 439/862 |
| 6,905,371 | B2 * | 6/2005 | Yi-Tse | H01R 24/62 439/861 |
| 8,998,629 | B2 * | 4/2015 | Endo | H01R 12/721 439/260 |
| 9,054,438 | B2 * | 6/2015 | Endo | H01R 13/114 |
| 9,306,306 | B2 * | 4/2016 | Nishio | H01R 13/05 |
| 9,331,411 | B2 * | 5/2016 | Endo | H01R 13/02 |
| 9,397,432 | B2 * | 7/2016 | Yukutake | H01R 13/46 |
| 9,413,095 | B2 * | 8/2016 | Miyazaki | H01R 13/514 |
| 9,461,406 | B2 * | 10/2016 | Okamoto | H01R 13/6315 |
| 9,509,069 | B2 * | 11/2016 | Komiyama | H01R 11/01 |
| 9,647,380 | B2 * | 5/2017 | Mukuno | H01R 13/5202 |
| 10,128,614 | B2 * | 11/2018 | Suzuki | H01R 13/11 |
| 10,276,976 | B1 * | 4/2019 | Phillips | H01R 13/629 |
| 10,355,381 | B2 * | 7/2019 | Ishikawa | H01R 12/716 |
| 10,411,387 | B2 * | 9/2019 | Nishida | H01R 13/50 |
| 10,431,912 | B2 * | 10/2019 | Murtagian | H01R 13/2442 |
| 10,498,082 | B2 * | 12/2019 | Suzuki | H01R 13/502 |
| 10,522,929 | B2 * | 12/2019 | Shimba | H01R 13/502 |
| 10,553,980 | B2 * | 2/2020 | Ogura | H01R 13/113 |
| 10,950,978 | B2 * | 3/2021 | Shioda | H01R 13/502 |
| 11,196,197 | B1 * | 12/2021 | Wen | H01R 12/57 |
| 12,300,930 | B2 * | 5/2025 | Ikegami | H01R 13/41 |
| 2001/0051451 | A1 * | 12/2001 | Isshiki | H05K 3/301 439/247 |
| 2002/0064988 | A1 * | 5/2002 | Fujita | H01R 13/7034 439/260 |
| 2004/0115998 | A1 | 6/2004 | Shirae et al. | |
| 2013/0217264 | A1 | 8/2013 | Endo et al. | |
| 2019/0199013 | A1 * | 6/2019 | Kanemura | H01R 4/185 |
| 2019/0363491 | A1 * | 11/2019 | Suzuki | H01R 13/405 |
| 2020/0083643 | A1 * | 3/2020 | Hashiguchi | H01R 13/6315 |
| 2020/0328539 | A1 * | 10/2020 | Lin | H01R 13/6273 |

FOREIGN PATENT DOCUMENTS

| | | | |
|---|---|---|---|
| JP | 2007-250320 | A | 9/2007 |
| JP | 2007-324029 | A | 12/2007 |
| JP | 2009-252599 | A | 10/2009 |
| JP | 2018-018605 | A | 2/2018 |
| JP | 2019-046703 | A | 3/2019 |

* cited by examiner

CARD EDGE CONNECTOR

CROSS REFERENCE TO RELATED APPLICATIONS

This application is a national phase of PCT application No. PCT/JP2022/007443, filed on 24 Feb. 2022, which claims priority from Japanese patent application No. 2021-043092, filed on 17 Mar. 2021, all of which are incorporated herein by reference.

TECHNICAL FIELD

The present disclosure relates to a card edge connector.

BACKGROUND

Patent Document 1 discloses an electrical connector in which a connector housing provided with a plurality of connector terminals is connected to a board-side connector provided on a circuit board. This electrical connector is configured to sandwich the circuit board by the plurality of connector terminals.

PRIOR ART DOCUMENT

Patent Document

Patent Document 1: JP 2013-171690 A

SUMMARY OF THE INVENTION

Problems to be Solved

Generally, the thickness and outer shape of a circuit board easily vary. Thus, if the thickness or outer shape of the circuit board varies in the electrical connector of Patent Document 1, there is a concern that contact pressures of the connector terminals and the circuit board vary.

A card edge connector of the present disclosure was completed on the basis of the above situation and aims to provide a card edge connector capable of improving electrical conduction between a terminal and a board.

Means to Solve the Problem

The present disclosure is directed to a card edge connector with a housing and a terminal fitting including a base portion to be fixed to the housing, a contact portion to be brought into electrical contact with a board assembled with the housing and a spring portion provided between the base portion and the contact portion for displaceably supporting the contact portion.

Effect of the Invention

According to the present disclosure, electrical conduction between a terminal and a board can be improved.

DETAILED DESCRIPTION TO EXECUTE THE INVENTION

Description of Embodiments of Present Disclosure

Figure 1:
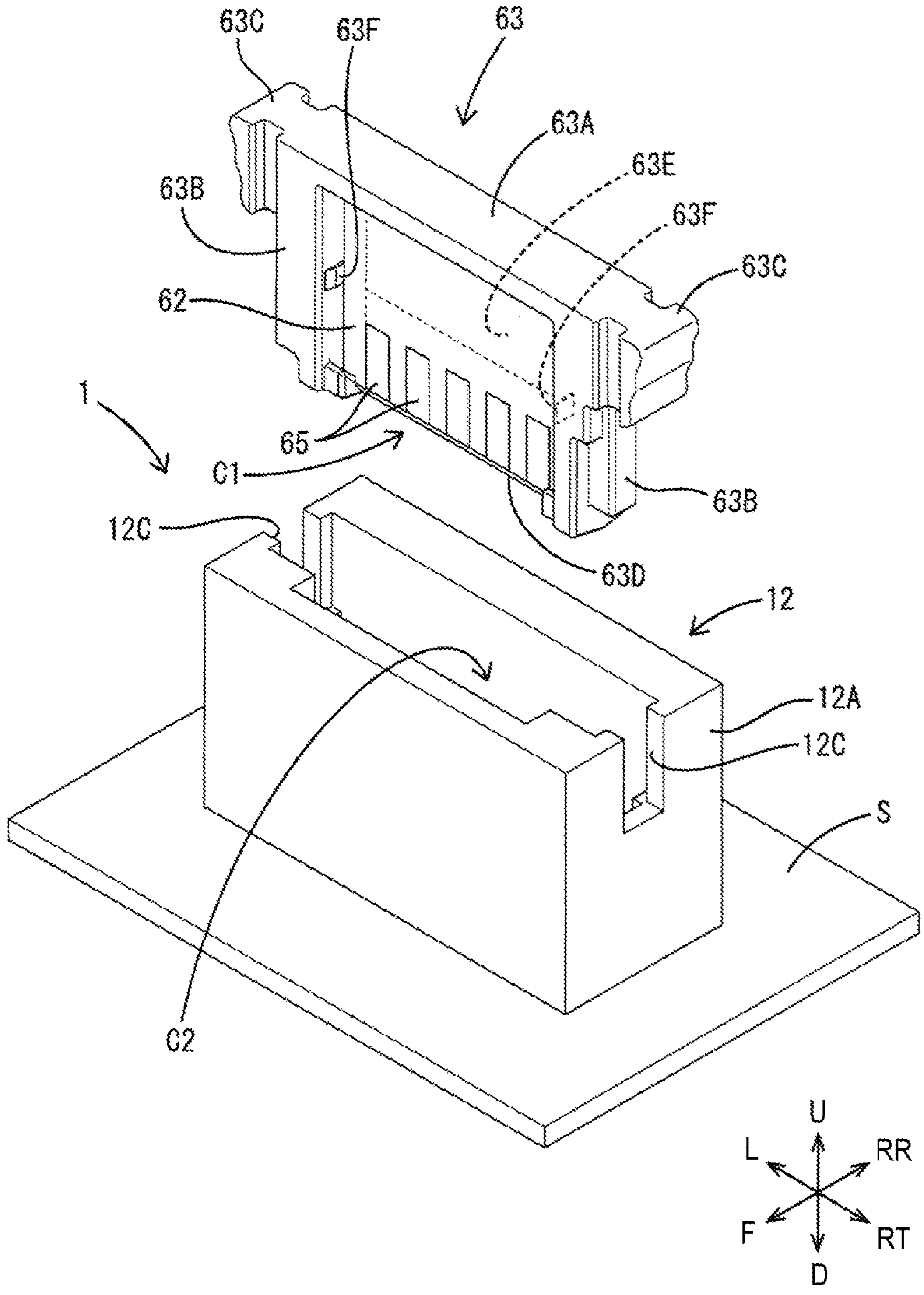
FIG. 1 is a perspective view of a card edge connector according to an embodiment.

First, embodiments of the present disclosure are listed and described.

(1) The card edge connector of the present disclosure is provided with a housing and a terminal fitting including a base portion to be fixed to the housing, a contact portion to be brought into electrical contact with a board assembled with the housing and a spring portion provided between the base portion and the contact portion for displaceably supporting the contact portion. According to this configuration, since the position of the contact portion is made displaceable by the spring portion, the position of the contact portion is easily adapted to a variation of the board.

(2) Preferably, the card edge connector of the present disclosure is provided with a box portion for accommodating the spring portion. According to this configuration, the spring portion can be protected by the box portion.

(3) Preferably, the box portion of the card edge connector of the present disclosure is coupled to the base portion via the spring portion and a gap is provided between the box portion and the base portion. According to this configuration, the box portion coupled to the base portion via the spring portion can be displaced without being rubbed against the base portion.

(4) Preferably, the gap of the card edge connector of the present disclosure is present in a direction orthogonal to a tolerance absorbing direction by the spring portion. According to this configuration, the box portion and the base portion can be prevented from being rubbed against each other in assembling the board with the housing.

(5) Preferably, the gap of the card edge connector of the present disclosure is present in a direction parallel to the tolerance absorbing direction by the spring portion. According to this configuration, since the box portion can also be displaced together with the contact portion, the interference of the box portion and the base portion can be made difficult while the spring portion is protected by the box portion.

(6) Preferably, the card edge connector of the present disclosure is provided with a locking portion connected to the contact portion and the spring portion, the locking portion locking the box portion. According to this configuration, since the locking portion locks the box portion, the influence of the spring portion on the movement of the resilient contact portion can be suppressed in assembling the board with the housing.

(7) Preferably, a plate thickness direction of the base portion of the card edge connector of the present disclosure is orthogonal to a tolerance absorbing direction by the spring portion. According to this configuration, even if the position of the board with respect to the housing is shifted in the tolerance absorbing direction and the box portion and the contact portion are shifted in the tolerance absorbing direction, the base portion is hardly deformed or deflected.

(8) Preferably, the spring portion of the card edge connector of the present disclosure includes an S-shaped portion. According to this configuration, a configuration for displaceably supporting the contact portion can be provided in a smaller region.

(9) Preferably, the contact portion of the card edge connector of the present disclosure includes a resilient contact portion projecting in a direction orthogonal to an assembling direction of the board with the housing, the resilient contact portion resiliently contacting the board, and the spring portion and the resilient contact portion are arranged in the same direction as the assembling direction. According to this configuration, a space formed by the resilient contact portion projecting in the direction orthogonal to the assembling direction of the board can be effectively utilized as an accommodation space for the spring portion.

DETAILS OF EMBODIMENTS OF PRESENT DISCLOSURE

Embodiment

Hereinafter, one specific embodiment of the present disclosure is described below with reference to FIGS. 1 to 7. Note that, in the following description, an upper side and a lower side in FIG. 2 are defined as a left side and a right side concerning a lateral direction. A left side and a right side in FIG. 2 are defined as a front side and a rear side concerning a front-rear direction. A frontal side and a back side in FIG. 2 are defined as an upper side and a lower side concerning a vertical direction.

In a card edge connector 1 according to the embodiment, a circuit board 62, which is a board, can be fit to terminal fittings 13 provided in a housing 12. As shown in FIG. 2, the card edge connector 1 is provided with the housing 12 and a plurality of the terminal fittings 13.

[Circuit Board]

Figure 2:
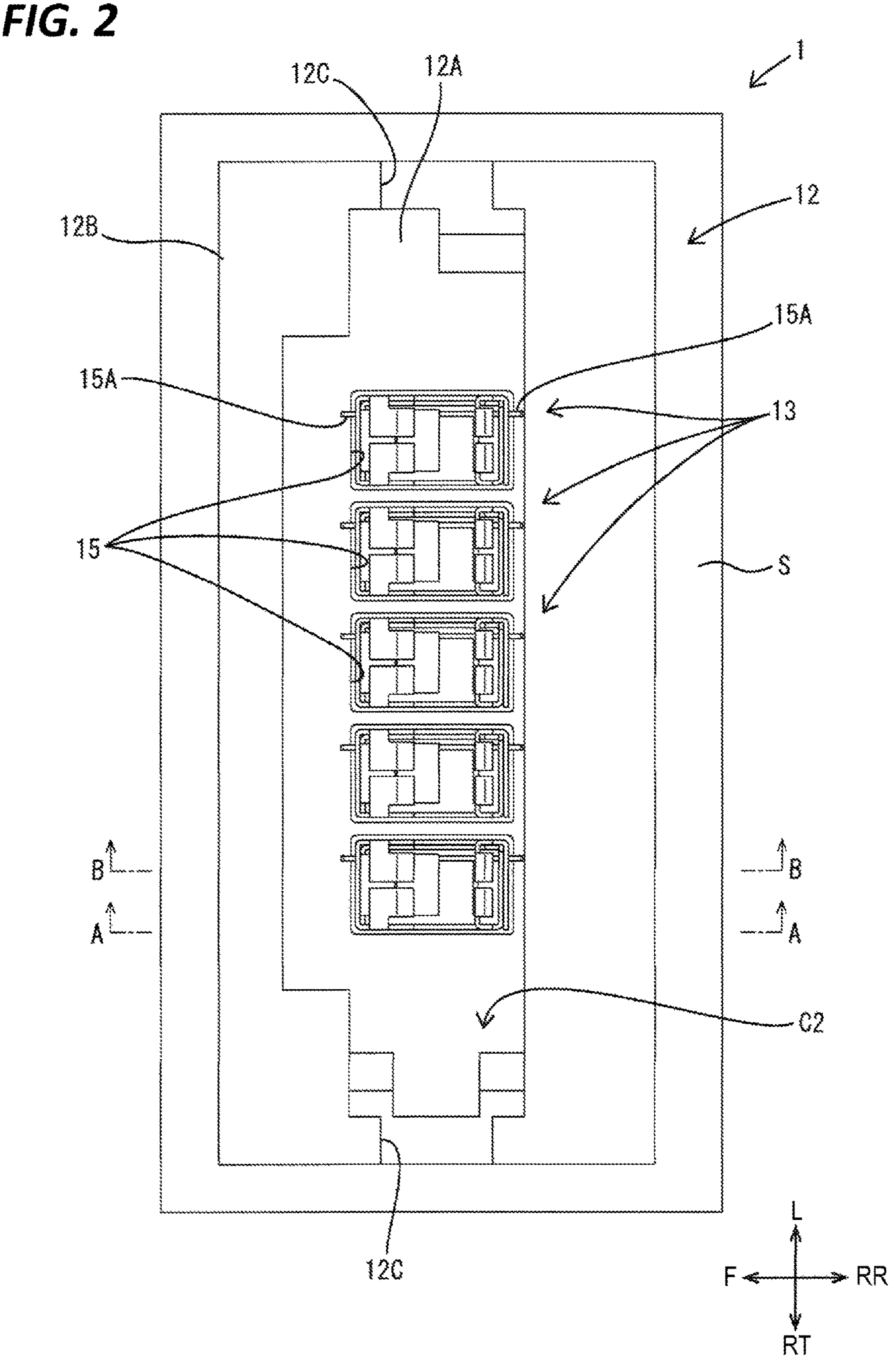
FIG. 2 is a plan view of the card edge connector.

As shown in FIG. 1, the circuit board 62 has a flat plate shape. Electronic components and the like are mounted on a surface of the circuit board 62. A plurality of electrically conductive portions 65 are provided side by side in the lateral direction on the surface of the circuit board 62. The respective electrically conductive portions 65 are arranged at positions corresponding to the plurality of terminal fittings 13 fixed in the housing 12.

[Circuit Board Holding Member]

A circuit board holding member 63 is made of synthetic resin. The circuit board holding member 63 includes a basis portion 63A, a pair of side wall portions 63B, a pair of grip portions 63C, an edge portion 63D, a butting portion 63E and the like. The basis portion 63A is formed to extend in the lateral direction. The pair of side wall portions 63B are formed to extend downward respectively from both end parts in the lateral direction of the basis portion 63A. The pair of grip portions 63C are upper end parts of the respective side wall portions 63B and extend in separating directions from the basis portion 63A toward both sides in the lateral direction. The edge portion 63D is provided to connect lower end parts of the pair of side wall portions 63B and extend in the lateral direction. The butting portion 63E has a substantially flat plate shape, and is coupled to rear sides of the basis portion 63A and the respective side wall portions 63B with a plate thickness direction oriented in the front-rear direction.

The circuit board holding member 63 is formed with an accommodation space C1 for accommodating the circuit board 62 in a region surrounded by the basis portion 63A, the pair of side wall portions 63B and the edge portion 63D. If the circuit board 62 is accommodated into the accommodation space C1, the circuit board 62 is held accommodated in the accommodation space C1 by locking portions 63F provided on the respective side wall portions 63B. The edge portion 63D is arranged to cover the lower end surface of the circuit board 62 from below. The edge portion 63D is formed with inclined surfaces 63G to reduce a dimension in the front-rear direction from the lower end surface of the circuit board 62 toward a lower side (see FIG. 7).

[Housing]

Figure 3:
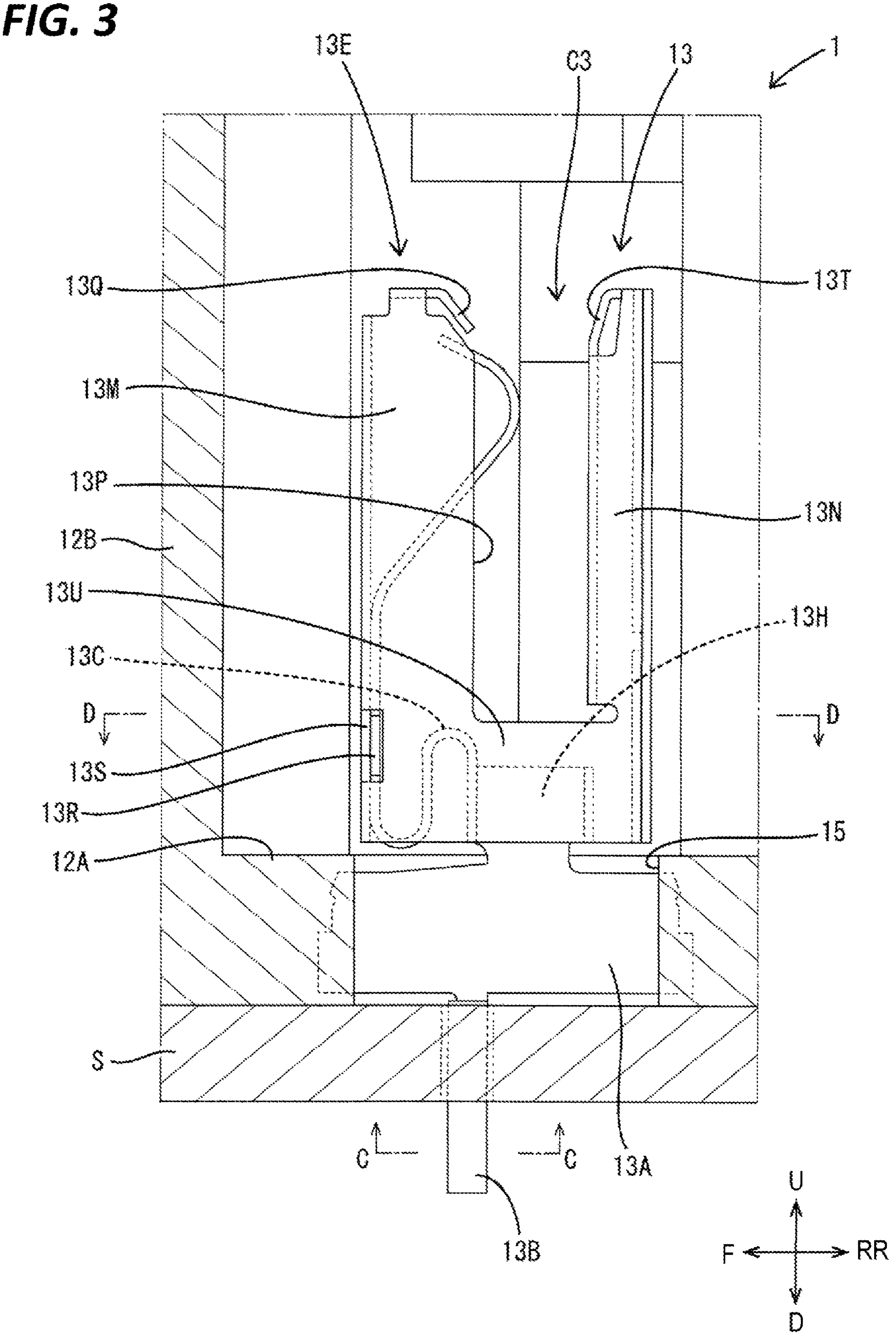
FIG. 3 is a section along A-A in FIG. 2.
Figure 4:
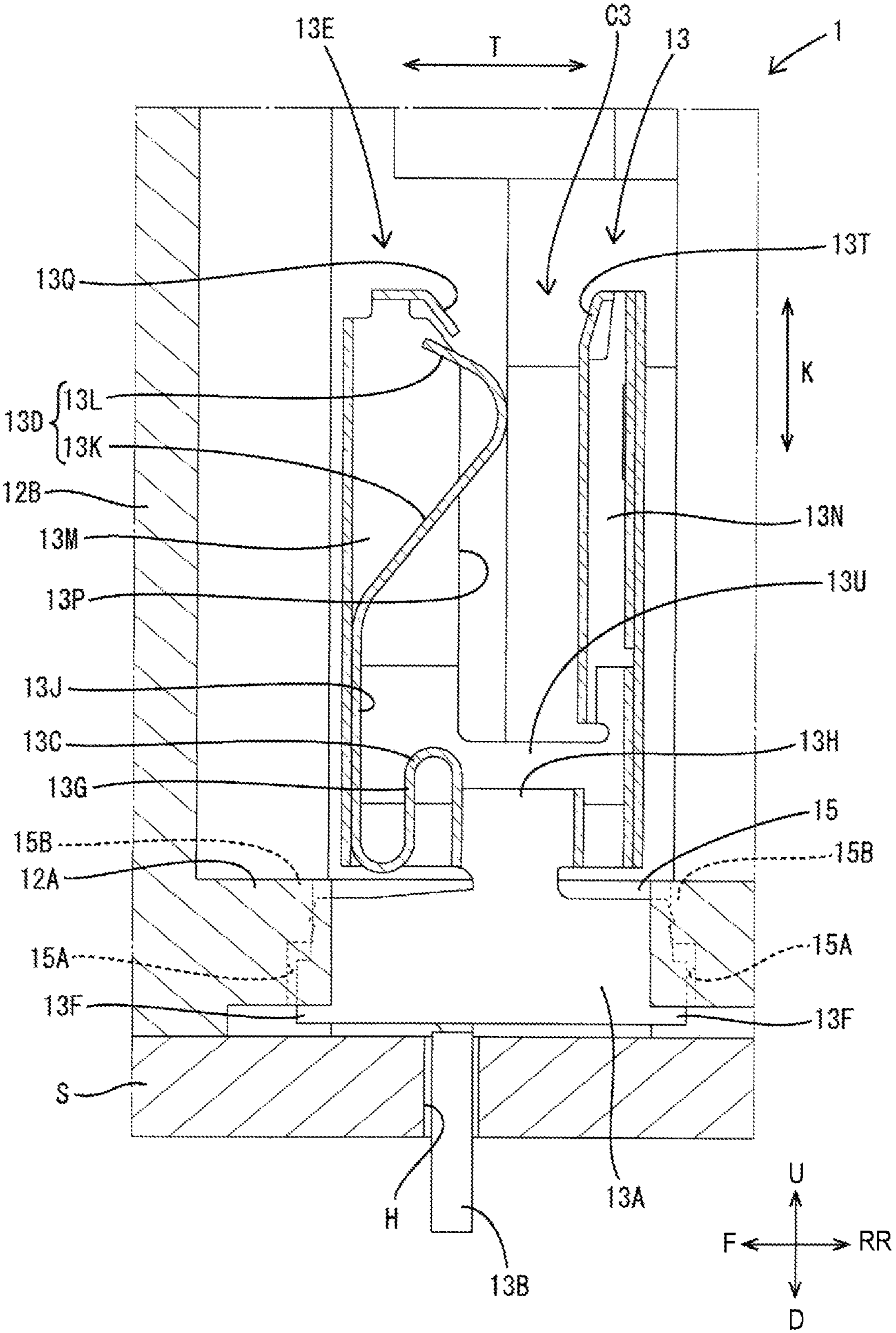
FIG. 4 is a section along B-B in FIG. 2.
Figure 5:
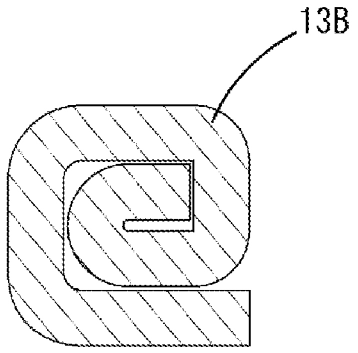
FIG. 5 is a section along C-C in FIG. 3.

The housing 12 is made of synthetic resin. As shown in FIGS. 2, 3 and 4, the housing 12 includes a flat plate-like base wall portion 12A and a peripheral wall portion 12B continuous around the base wall portion 12A and extending upward. A plurality of cavities 15 for respectively accommodating the plurality of terminal fittings 13 are formed to penetrate through the base wall portion 12A in the vertical direction. The plurality of cavities 15 are arranged in a row in the lateral direction. The housing 12 is configured such that the base wall portion 12A can be coupled to a base board S along the upper surface of the base board S.

A pair of slits 15A are formed in each cavity 15. The pair of slits 15A are formed to be recessed in directions separating from each other in front and rear surfaces constituting each cavity 15. Retaining portions 15B for restricting the terminal fitting 13 inserted into the cavity 15 from coming out upward are formed on upper sides of the pair of slits 15A (see FIG. 4). A pair of the restricting portions 15B project in directions toward each other on facing inner surfaces of the pair of slits 15A.

An upper part of the peripheral wall portion 12B is cut to be recessed downward, thereby forming a pair of grooves 12C (see FIG. 2). These grooves 12C are formed side by side with both sides in the lateral direction of the plurality of cavities 15 arranged in a row. The pair of grip portions 63C of the circuit board holding member 63 are inserted into these grooves 12C (see FIG. 1). The housing 12 is formed with an insertion space C2, into which the circuit board 62 held in the circuit board holding member 63 is inserted, in a region surrounded by the base wall portion 12A and the peripheral wall portion 12B (see FIGS. 1 and 2).

[Terminal Fitting]

The terminal fitting 13 is formed, such as by bending an electrically conductive metal plate. As shown in FIG. 4, the terminal fitting 13 includes a base portion 13A, a shaft portion 13B, a spring portion 13C, a contact portion 13D, a box portion 13E and the like. The base portion 13A has a flat plate shape and is arranged with a plate thickness direction oriented in the lateral direction. An extending portion 13H extending upward is provided in a central part in the front-rear direction of the base portion 13A. A rear end part of the extending portion 13H is bent to extend rightward (see FIG. 6). A pair of projecting portions 13F projecting in directions separating from each other along the front-rear direction are provided on lower sides of both end parts in the front-rear direction of the base portion 13A. The base portion 13A is fixed to the housing 12 by inserting the both end parts in the front-rear direction thereof into the pair of slits 15A formed in the cavity 15 of the housing 12.

The shaft portion 13B extends downward from a central part in the front-rear direction of the lower end of the base portion 13A. The shaft portion 13B is formed by being wound into a roll (see FIG. 5). In this way, one surface of the metal plate is exposed and the other surface is not exposed on the outer peripheral surface of the shaft portion 13B. The outer peripheral surface of the shaft portion 13B is constituted by a substantially smooth curved surface. The shaft portion 13B is inserted into a through hole H formed in the base board S and fixed to the base board S by soldering. Since the outer peripheral surface of the shaft portion 13B is constituted by the substantially smooth curved surface, solder easily adheres. That is, the outer peripheral surface of the shaft portion 13B is good in solder wettability.

The spring portion 13C includes an S-shaped portion 13G having an S shape when viewed from left or right. One end part of the S-shaped portion 13G is coupled to the extending portion 13H of the base portion 13A. The other end part of the S-shaped portion 13G is located forward of the one end part. One end side of the S-shaped portion 13G is curved into a U shape to bulge upward. The other end side of the S-shaped portion 13G is curved into a U shape to bulge downward. These U-shaped parts of the S-shaped portion 13G can be resiliently changed in the front-rear direction. A coupling portion 13J extending upward with a plate thickness direction oriented in the front-rear direction is provided on the other end side of the S-shaped portion 13G. The other end side of the S-shaped portion 13G can swing in the front-rear direction. That is, a tolerance can be absorbed in the front-rear direction by the spring portion 13C, and the front-rear direction is a tolerance absorbing direction T. The tolerance absorbing direction T is a direction orthogonal to the plate thickness direction of the base portion 13A (lateral direction) (see FIG. 6). The other end side of the spring portion 13C can swing also in the lateral direction.

The contact portion 13D includes a resilient contact portion 13K coupled to the upper end of the coupling portion 13J and extending obliquely to an upper-rear side and a catching portion 13L coupled to the upper end of the resilient contact portion 13K and extending oblique to an upper-front side. That is, the contact portion 13D is coupled to the base portion 13A via the coupling portion 13J and the spring portion 13C. Further, the spring portion 13C is provided between the base portion 13A and the contact portion 13D and displaceably supports the contact portion 13D by being resiliently deformed. The resilient contact portion 13K of the contact portion 13D projects while having a width in a direction orthogonal to an assembling direction K of the circuit board 62 with the housing 12. The resilient contact portion 13K of the contact portion 13D electrically contacts the electrically conductive portion 65 of the circuit board 62 assembled with the housing 12 (see FIG. 7). The spring portion 13C and the resilient contact portion 13K are arranged in the same direction as the assembling direction K.

The box portion 13E has a box shape. The box portion 13E includes a basis portion 13U, a box body portion 13M and a tubular portion 13N. The basis portion 13U has a rectangular parallelepiped tubular shape long in the front-rear direction in a plan view (see FIG. 6). The basis portion 13U is arranged to cover the extending portion 13H of the base portion 13A in the front-rear direction and lateral direction. The basis portion 13U of the box portion 13E accommodates the spring portion 13C. The basis portion 13U is coupled to the coupling portion 13J (see FIG. 6). That is, the box portion 13E is coupled to the base portion 13A via the coupling portion 13J and the spring portion 13C.

The box body portion 13M extends upward from the upper end of a front side of the basis portion 13U. The box body portion 13M is formed with an opening 13P open rearward. An upper end part of the box body portion 13M is formed with a first inclined portion 13Q extending obliquely to a rear-lower side. The first inclined portion 13Q is arranged to cover a tip part of the catching portion 13L of the contact portion 13D from behind (see FIG. 4).

Figure 6:
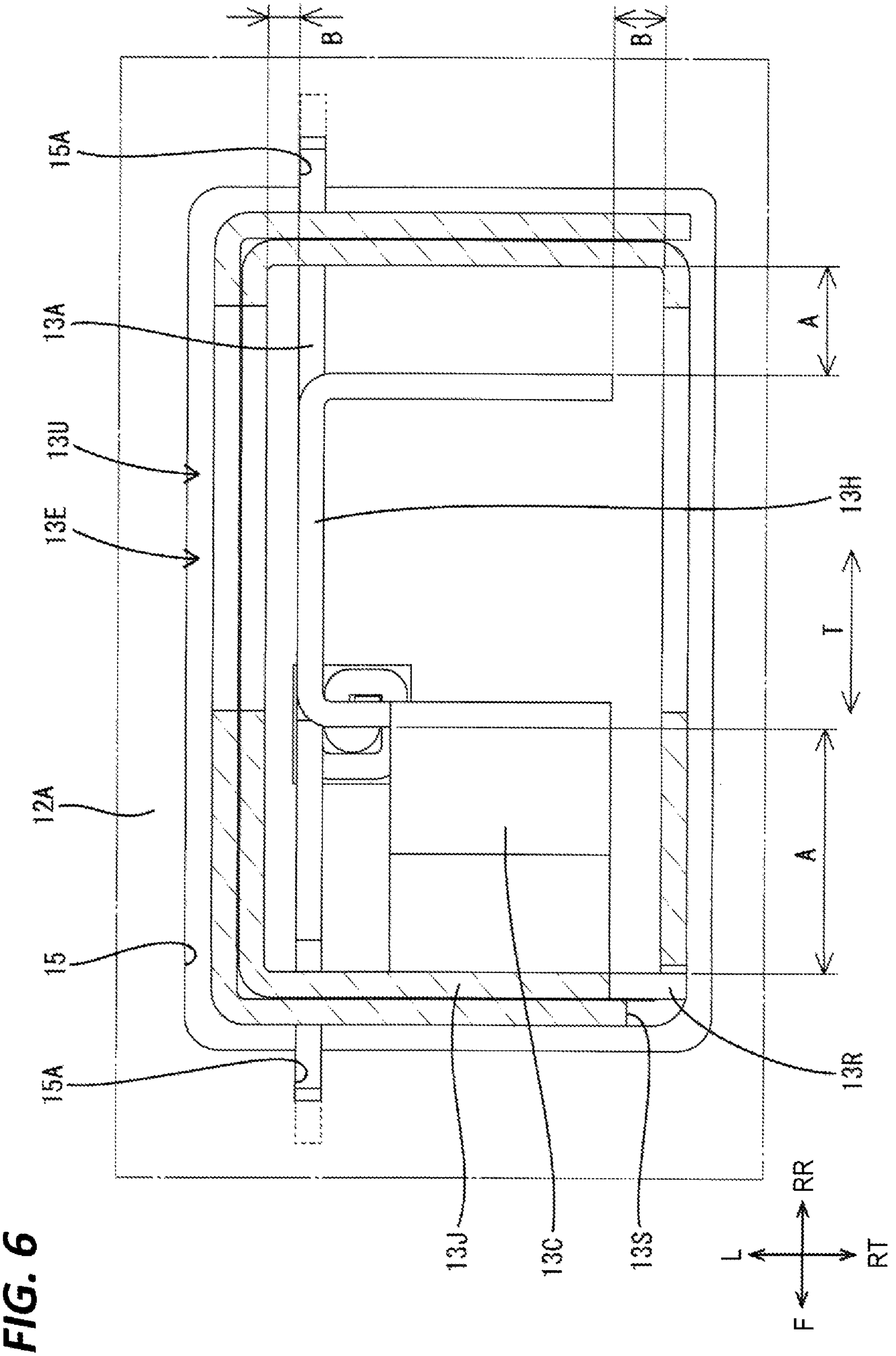
FIG. 6 is a section along D-D in FIG. 3.
Figure 7:
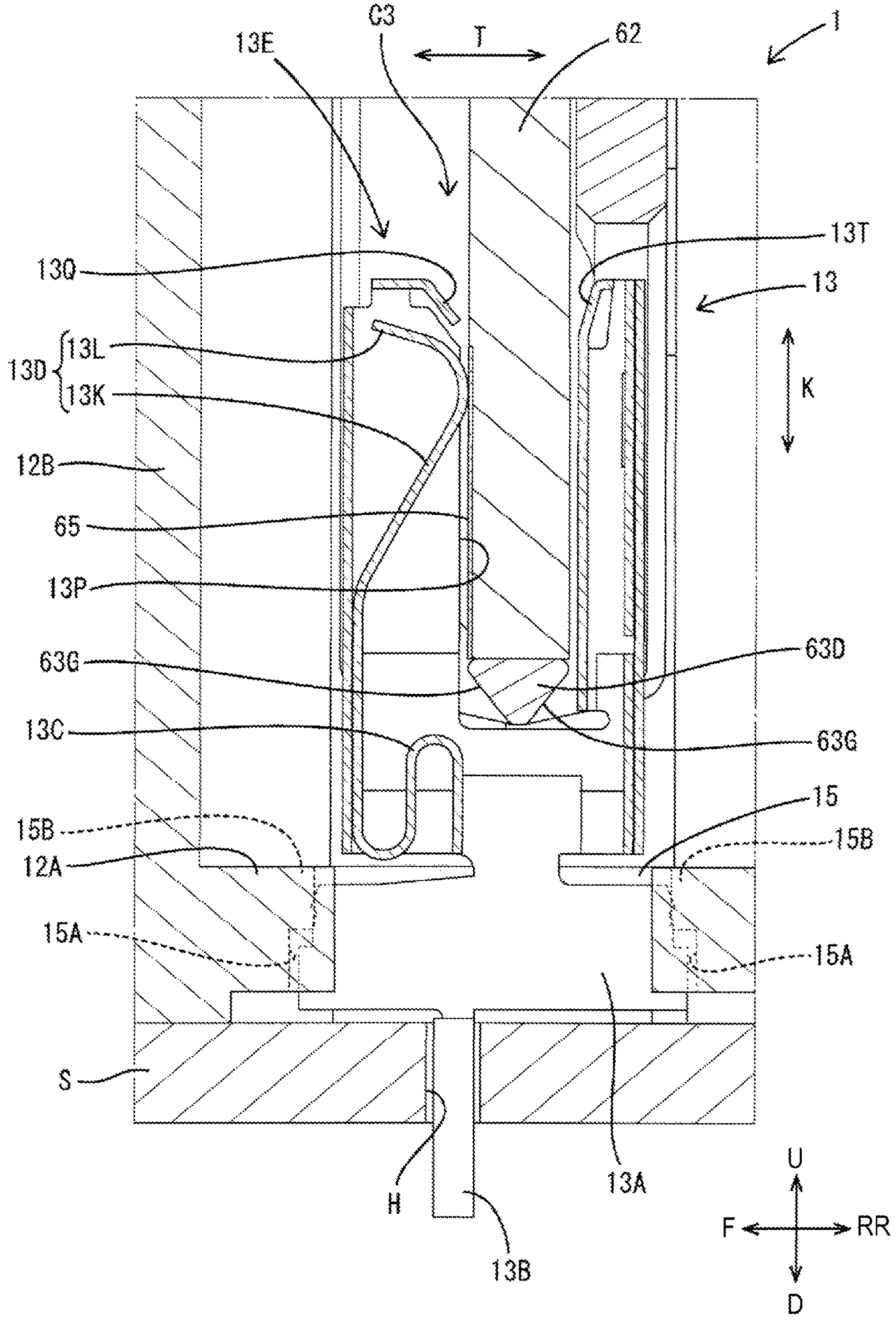
FIG. 7 is a section along B-B in FIG. 2 showing a state assembled with a circuit board.

The coupling portion 13J is in surface contact with inner surfaces of a front wall of the basis portion 13U and a front wall of the box body portion 13M (see FIGS. 4 and 6). Further, a locking portion 13R projecting rightward is provided on the right end of the coupling portion 13J (see FIG. 6). The locking portion 13R is connected to the contact portion 13D and the spring portion 13C via the coupling portion 13J. The locking portion 13R is inserted into an insertion hole 13S formed in the basis portion 13U for locking (see FIGS. 3 and 6). In this way, even if an external force is applied to the box portion 13E, relative positions of the box portion 13E and the contact portion 13D are hardly shifted. The box portion 13E and the contact portion 13D are both coupled to the base portion 13A via the coupling portion 13J and the spring portion 13C. Thus, the box portion 13E and the contact portion 13D can integrally swing with respect to the base portion 13A.

The tubular portion 13N extends upward from the upper end of a rear side of the basis portion 13U while having a tubular shape. The tubular portion 13N is arranged behind and adjacent to the opening 13P of the box body portion 13 and along the box body portion 13M. A second inclined portion 13T extending obliquely to a front-lower side is formed on an upper end part of the tubular portion 13N. An insertion space C3, into which the circuit board 62 is inserted, is formed between the opening 13P of the box body portion 13M and the tubular portion 13N. The resilient contact portion 13K and the catching portion 13L project rearward via the opening 13P of the box body portion 13M. That is, the resilient contact portion 13K is facing the insertion space C3, into which the circuit board 62 is inserted. A width in the front-rear direction of the box body portion 13M is larger than that of the tubular portion 13N. That is, the insertion space C3 is formed at a position close to the rear side of the box portion 13E.

As shown in FIG. 6, gaps A and B are provided between the basis portion 13U of the box portion 13E and the base portion 13A. The gaps A are present in a direction parallel to the tolerance absorbing direction T by the spring portion 13C. The gaps B are present in a direction orthogonal to the tolerance absorbing direction T by the spring portion 13C.

The box portion 13E of the terminal fitting 13 is inserted into each cavity 15 of the housing 12 from below, and the both end parts in the front-rear direction of the base portion 13A are inserted into the pair of slits 15A. Since a dimension between the tips of the pair of projecting portions 13F of the base portion 13A is larger than a dimension between the restricting portions 15B of the slits 15A, the terminal fitting 13 is restricted from coming up upward (see FIG. 4).

[Assembling of Card Edge Connector with Circuit Board]

The circuit board 62 accommodated in the circuit board holding member 63 is caused to enter the insertion space C2 from above the housing 12. If the circuit board 62 is further inserted into the insertion space C2, the circuit board 62 is inserted into the insertion space C3 of the terminal fitting 13 (see FIG. 7). At this time, the inclined surface 63G of the edge portion 63D located on the lower end of the circuit board 62 contacts the first inclined portion 13Q or the second inclined portion 13T formed on the upper end of the terminal fitting 13, whereby a lower end part of the circuit board 62 is guided into the insertion space C3. If the circuit board 62 is further inserted into the insertion space C3, the resilient contact portion 13K resiliently contacts the electrically conductive portion 65 of the circuit board 62 while being resiliently deformed. Then, the edge portion 63D of the circuit board holding member 63 reaches a lower end part (back part) of the insertion space C3. In this way, the assembling of the circuit board 62 with the housing 12 is completed.

If a plate thickness of the circuit board 62 varies, the box portion 13E and the contact portion 13D are displaced in the tolerance absorbing direction T by the spring portion 13C. At this time, the box portion 13E and the contact portion 13D are displaced within a range of the gap A formed between the base portion 13A and the box portion 13E, the contact portion 13D (see FIG. 6). In this way, the box portion 13E and the contact portion 13D are adjusted to positions corresponding to the plate thickness of the circuit board 62 by the spring portion 13C.

If the circuit board 62 swings in the lateral direction in assembling the circuit board 62 with the housing 12, the box portion 13E and the contact portion 13D are displaced in the lateral direction (i.e. direction orthogonal to the tolerance absorbing direction T) by the spring portion 13C. At this time, the box portion 13E and the contact portion 13D are displaced within a range of the gap B formed between the base portion 13A and the box portion 13E, the contact portion 13D (see FIG. 6). In this way, even if the circuit board 62 swings in the lateral direction in assembling the circuit board 62 with the housing 12, the box portion 13E and the contact portion 13D can be caused to follow this swinging movement.

[Separation of Circuit Board from Card Edge Connector]

The circuit board holding member 63 and the circuit board 62 are separated from the housing 12 by gripping the grip portions 63C of the circuit board holding member 63. Then, the circuit board 62 inserted into the insertion space C3 is separated from the insertion space C3 and the resilient contact portion 13K held in resilient contact with the electrically conductive portion 65 of the circuit board 62 resiliently returns to an original posture (see FIGS. 3 and 4).

If the circuit board 62 having a varying thickness was inserted, the box portion 13E and the contact portion 13D displaced to the positions corresponding to the varying plate thickness of the circuit board 62 return to original positions by the spring portion 13C resiliently returning to an original posture.

If the circuit board 62 swings in the lateral direction in separating the circuit board 62 from the housing 12, the box portion 13E and the contact portion 13D are displaced in the lateral direction (i.e. direction orthogonal to the tolerance absorbing direction T) by the spring portion 13C. At this time, the box portion 13E and the contact portion 13D are displaced within the range of the gap B formed between the base portion 13A and the box portion 13E, the contact portion 13D (see FIG. 6). In this way, even if the circuit board 62 swings in the lateral direction in separating the circuit board 62 from the housing 12, the box portion 13E and the contact portion 13D can be caused to follow this swinging movement.

Next, functions and effects of the first embodiment are described.

The card edge connector 1 of the present disclosure is provided with the housing 12 and the terminal fittings 13. The terminal fitting 13 includes the base portion 13A to be fixed to the housing 12, the contact portion 13D to be brought into electrical contact with the circuit board 62 assembled with the housing 12 and the spring portion 13C provided between the base portion 13A and the contact portion 13D for displaceably supporting the contact portion 13D. According to this configuration, since the position of the contact portion 13D is made displaceable by the spring portion 13C, the position of the contact portion 13D is easily adapted to a variation of the circuit board 62.

The card edge connector 1 of the present disclosure is provided with the box portion 13E for accommodating the spring portion 13C. According to this configuration, the spring portion 13C can be protected by the box portion 13E.

The box portion 13E of the card edge connector 1 of the present disclosure is coupled to the base portion 13A via the spring portion 13C, and the gaps A and B are provided between the box portion 13E and the base portion 13A. According to this configuration, the box portion 13E coupled to the base portion 13A via the spring portion 13C can be displaced without being rubbed against the base portion 13A.

The gap B of the card edge connector 1 of the present disclosure is present in the direction orthogonal to the tolerance absorbing direction T by the spring 13C. According to this configuration, the box portion 13E and the base portion 13A can be prevented from being rubbed against each other in assembling the circuit board 62 with the housing 12.

The gap A of the card edge connector 1 of the present disclosure is present in the direction parallel to the tolerance absorbing direction T by the spring portion 13C. According to this configuration, since the box portion 13E can be also displaced together with the contact portion 13D, the interference of the box portion 13E and the base portion 13A can be made difficult while the spring portion 13C is protected by the box portion 13E.

The card edge connector 1 of the present disclosure is provided with the locking portion 13R connected to the contact portion 13D and the spring portion 13C via the coupling portion 13J, and the locking portion 13R locks the box portion 13E. According to this configuration, since the locking portion 13R locks the box portion 13E, it is possible to suppress the influence of the spring portion 13C on the movement of the resilient contact portion 13K in assembling the circuit board 62 with the housing 12.

The plate thickness direction of the base portion 13A of the card edge connector 1 of the present disclosure is orthogonal to the tolerance absorbing direction T by the spring portion 13C. According to this configuration, even if the position of the circuit board 62 with respect to the housing 12 is shifted in the tolerance absorbing direction T and the box portion 13E and the contact portion 13D are shifted in the tolerance absorbing direction T, the base portion 13A is hardly deformed or deflected.

The spring portion 13C of the card edge connector 1 of the present disclosure includes the S-shaped portion 13G. According to this configuration, a configuration for displaceably supporting the contact portion 13D can be provided in a smaller region.

The contact portion 13D of the card edge connector 1 of the present disclosure includes the resilient contact portion 13K projecting in the direction orthogonal to the assembling direction K of the circuit board 62 with the housing 12 and to be brought into resilient contact with the circuit board 62. The spring portion 13C and the resilient contact portion 13K are arranged in the same direction as the assembling direction K. According to this configuration, a space formed by the resilient contact portion 13K projecting in the direction orthogonal to the assembling direction K of the circuit board 62 can be effectively utilized as an accommodation space for the spring portion 13C.

OTHER EMBODIMENTS

The embodiment disclosed this time should be considered illustrative in all aspects, rather than restrictive. The scope of the present invention is not limited by the embodiment disclosed this time, but is represented by claims and intended to include all changes in the scope of claims and in the meaning and scope of equivalents.

Figure 8:
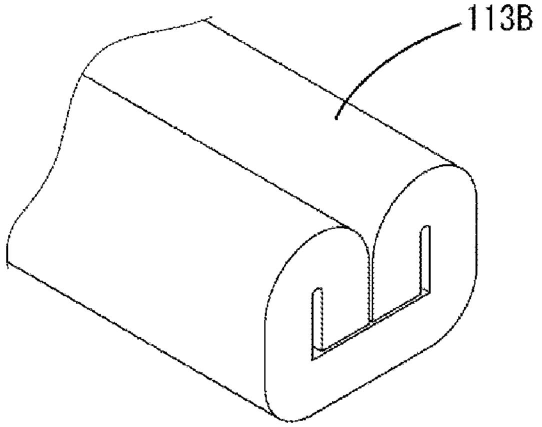
FIG. 8 is a perspective view showing a shaft portion in another embodiment.

Although the shaft portion is wound into a roll in the case of the above embodiment, a shaft portion 113B may be formed by being wound as shown in FIG. 8.

Although the box portion includes the box body portion and the tubular portion in the case of the above embodiment, a central part in the front-rear direction of the box portion may be cut to form a pair of box body portions and a contact portion may be provided on each box body portion.

Although the one end side of the S-shaped portion is curved into a U shape to bulge upward and the other end side of the S-shaped portion is curved into a U shape to bulge downward in the case of the above embodiment, the one end side of the S-shaped portion may be curved into a U shape to bulge downward and the other end side of the S-shaped portion is curved into a U shape to bulge upward. In this case, the other end side of the S-shaped portion is thought to be formed by hemming bending. Further, three or more parts curved into an U shape convex upward or downward may be provided.

LIST OF REFERENCE NUMERALS

1 . . . card edge connector
12 . . . housing
12A . . . base wall portion
12B . . . peripheral wall portion
12C . . . groove
13 . . . terminal fitting
13A . . . base portion
13B, 113B . . . shaft portion
13C . . . spring portion
13D . . . contact portion
13E . . . box portion
13F . . . projecting portion
13G . . . S-shaped portion
13H . . . extending portion
13J . . . coupling portion
13K . . . resilient contact portion
13L . . . catching portion
13M . . . box body portion
13N . . . tubular portion
13P . . . opening
13Q . . . first inclined portion
13R . . . locking portion
13S . . . insertion hole
13T . . . second inclined portion
13U . . . basis portion
15 . . . cavity
15A . . . slit
15B . . . retaining portion
62 . . . circuit board (board)
63 . . . circuit board holding member
63A . . . basis portion
63B . . . side wall portion
63C . . . grip portion
63D . . . edge portion
63E . . . butting portion
63F . . . locking portion
63G . . . inclined surface
65 . . . electrically conductive portion
A, B . . . gap
C1 . . . accommodation space
C2, C3 . . . insertion space
H . . . through hole
K . . . assembling direction
S . . . base board
T . . . tolerance absorbing direction

What is claimed is:

1. A card edge connector, comprising:
a housing; and
a terminal fitting including a base portion to be fixed to the housing, a contact portion to be brought into electrical contact with a board assembled with the housing and a spring portion provided between the base portion and the contact portion for displaceably supporting the contact portion,
the spring portion is accommodated in a box portion, and the box portion is inserted into a cavity of the housing.

2. The card edge connector of claim 1, comprising a box portion for accommodating the spring portion.

3. The card edge connector of claim 2, wherein:
the box portion is coupled to the base portion via the spring portion, and
a gap is provided between the box portion and the base portion.

4. The card edge connector of claim 3, wherein the gap is present in a direction orthogonal to a tolerance absorbing direction by the spring portion.

5. The card edge connector of claim 3, wherein the gap is present in a direction parallel to the tolerance absorbing direction by the spring portion.

6. The card edge connector of claim 2, comprising a locking portion connected to the contact portion and the spring portion, the locking portion locking the box portion.

7. The card edge connector of claim 1, wherein a plate thickness direction of the base portion is orthogonal to a tolerance absorbing direction by the spring portion.

8. The card edge connector of claim 1, wherein the spring portion includes an S-shaped portion.

9. The card edge connector of claim 1, wherein:
the contact portion includes a resilient contact portion projecting in a direction orthogonal to an assembling direction of the board with the housing, the resilient contact portion resiliently contacting the board, and
the spring portion and the resilient contact portion are arranged in the same direction as the assembling direction.

* * * * *